Figure 1:
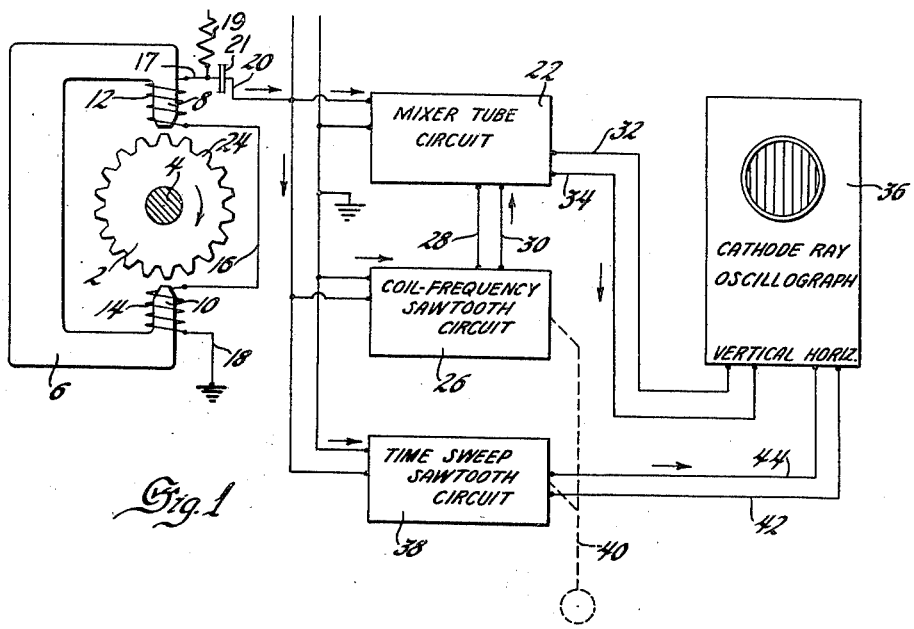

May 7, 1946.   L. F. HOPE   2,399,635
TORSIOGRAPH
Filed Feb. 28, 1944   2 Sheets-Sheet 1

Inventor
Lawrence F. Hope
By Blackmore, Spencer & Flint
Attorneys

May 7, 1946.　　　　L. F. HOPE　　　　2,399,635
TORSIOGRAPH
Filed Feb. 28, 1944　　　　2 Sheets-Sheet 2

Inventor
Lawrence F. Hope
By Blackmore, Spencer & Olivr
Attorneys

Patented May 7, 1946

2,399,635

UNITED STATES PATENT OFFICE 2,399,635

TORSIOGRAPH

Lawrence F. Hope, Grosse Pointe Farms, Mich., assignor to General Motors Corporation, Detroit, Mich., a corporation of Delaware Application February 28, 1944, Serial No. 524,337

13 Claims. (Cl. 73—68)

This invention relates to measuring or indicating means and more particularly to means for measuring the torsional vibration on a rotating member.

There are many instances in which it is desirable to measure the torsional vibration on a rotating shaft in order to improve or correct the operation or design of the associated mechanism. One example of an instance where torsional vibrational measurements should be made is in internal combustion engines in which it is desired to obtain as even a flow of power to the rotating shaft as possible, inasmuch as in such an engine the power impulses to the shaft occur at spaced time intervals and power is not applied to the shaft from the pistons in an even flow. In order to be able to study the results of the power application of the explosions within the cylinders to the shaft, as well as centrifugal forces resulting from the rotation of the various eccentric parts thereof, it is necessary to provide some means for measuring and indicating the fluctations in the rotation or torsional vibration of the shaft. This of course is only one example, there being many other instances in which torsional shaft vibration study is desirable.

In a number of instances it is also difficult to obtain access to the shaft in order to apply thereto some means for picking up or detecting the shaft rotation or any variation in the same caused by torsional vibration. This is particularly true of internal combustion engines where the majority of the shaft lies within the block and is not accessible. It is therefore essential to provide such pick-up means as is relatively small and easily applicable to what available shaft portion there exists.

It is therefore an object of my invention to provide means for measuring torsional vibration in a rotating shaft or body.

It is a further object of my invention to provide means for measuring torsional vibration which is easily applicable to a rotating body.

It is a still further object of my invention to provide means for measuring torsional vibration of a rotating body which is easily operated and provides a reading of both the amplitude of vibration and its wave form.

It is a still further object of my invention to provide means for measuring torsional vibration of a rotating body indicating both the wave form of such vibration and some of the frequencies present therein.

With these and other objects in view which will become apparent as the specification proceeds, the embodiments of my invention are best understood by reference to the following specification and claims and the illustrations in the accompanying drawings, in which:

Figure 1 is a schematic block diagram showing the various parts of one form of measuring means for torsional vibration.

Figures 2-8 inc. are graphs showing various wave forms and combinations of wave forms which occur at various stages in the measuring apparatus up to and including the cathode ray graph.

Figure 9:
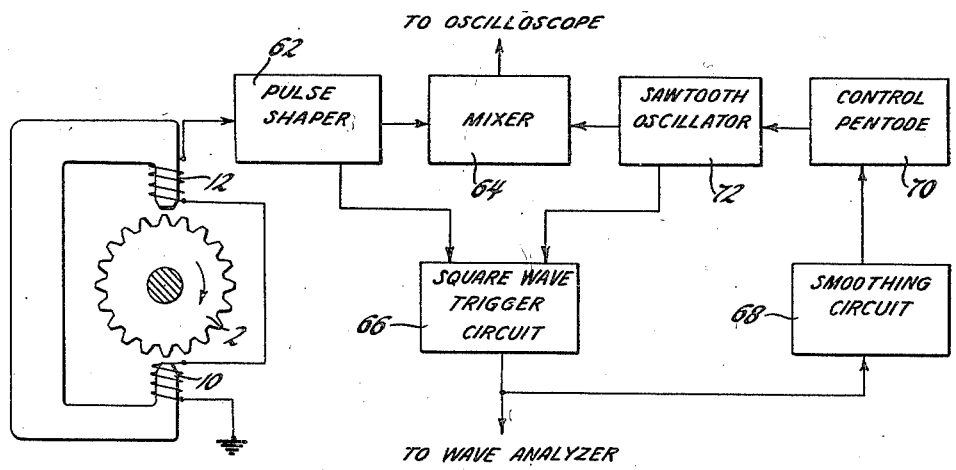

Figure 9 is a schematic block diagram similar to Figure 1 showing a modified form of my invention.

Figures 10-14 inclusive are graphs showing various wave forms occurring at different stages in the system shown in Figure 9.

Referring now more specifically to the system as set forth in Figure 1, there is shown therein a thin toothed wheel 2 having a relatively large number of teeth which is fixedly applied to a shaft 4 being tested and therefore rotates therewith at shaft speed. Stationarily mounted in proximity to the toothed wheel 2 is a yoke 6 of magnetic material having two poles 8 and 10 spaced at 180° apart and in relatively close proximity to the periphery of the disc 2. A pick-up coil 12 is wound around pole 8 and a similar pick-up coil 14 around pole 10. These two coils are connected together in series by line 16, the remaining terminal of coil 14 being grounded as at 18 and that of 12 connected to lead 17. This conductor is connected to an input resistor 19 to limit the current from a direct current source (not shown) and also to a condenser 21 to isolate the direct current from that portion of the system to the right thereof in Fig. 1. The condenser 21 is conected also to lead 20 which is connected into a mixer tube circuit 22, to the coil frequency sawtooth oscillator 26 and to the time sweep sawtooth oscillator. These sawtooth oscillator circuits are conventional in oscilloscopes for the horizontal sweep circuits and may be of the type disclosed on page 186 in Figs. 4-25 of a book "Ultra High Frequency Techniques" by J. G. Brainerd, published by D. Van Nostrand in 1942. Thus as the shaft rotates, the teeth 24 of the toothed member 2 coming into alignment with the poles 8 and 10 will vary the magnetic reluctance of the circuit and alter the flux passing through the pick-up coils 12 and 14 and thus generate a fluctuating current in the input line 20 to the mixer tube and interlocking time circuits.

The oscillator circuit 26 for generating a sawtooth wave is connected through lines 28 and 30 to the mixer tube circuit and therefore these waves are combined with the waves generated by the rotating disc 2. The output of the mixer tube circuit 22 is connected through lines 32 and 34 with the vertical deflector circuit plate of a conventional cathode ray oscillograph for controling the vertical position of the cathode ray spot in the tube. The time sweep sawtooth circuit 38 is synchronized with the generated pulse and the sawtooth circuit 26, the two sawtooth generators being adjusted by a common control 40, the latter circuit 38 being connected through lines 42 and 44 to control the horizontal sweep circuit of the oscillograph 36. Thus the horizontal and vertical circuits controlling the path of the cathode ray are synchronized together and upon the vertical deflectors there is superimposed the output of the rotating toothed wheel 2.

Figure 2:
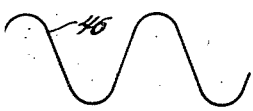
Figure 3:
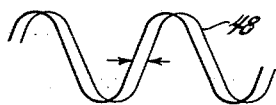
Figure 4:
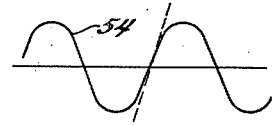

The toothed wheel 2 generates substantially a sine wave, depending upon the outline of the teeth 24 which are shown in Figure 2 at 46, and this is the configuration which would be applied to the cathode ray oscillograph head if only this energization were applied to the vertical plates with uniform timed sweep and there was no torsional vibration present in the shaft, that is, each time a tooth 24 reached an aligning position between the poles 8 and 10, a wave of this configuration would be generated and applied to the cathode ray head. However, if there was present any torsional vibration, each of the generated waves would not be superimposed or fall exactly on top of that preceding or following, but would be spaced slightly to one side or the other, leading or lagging, depending on the vibration present. Therefore there would roughly appear on the head of the cathode ray tube a band of waves such as shown in Figure 3 at 48, the width of this band, the distance indicated by the arrow, indicating the amplitude of the torsional vibration of that distance by which the waves fail to fall in alignment, and due of course to torsional vibration of the shaft.

Figure 5:
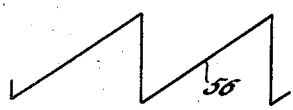
Figure 6:

Up to this point the apparatus disclosed is capable of indicating the amplitude of the vibration, but there is no indication provided as to the wave form of such vibration. In order to obtain such wave form, I have incorporated an oscillator circuit 26 capable of generating a sawtooth wave form such as shown in Figure 5, which is synchronized with the incoming circuit by being triggered by the pulse in line 20 such as shown at 54 in Figure 4, and connected to the mixer through lines 28 and 30. When the two waves, namely the wave 46 or the series of non-aligning waves 48, are applied to the recurrent series of sawtooth waves 56, a wave form similar to that shown in Figure 6 is developed.

Figure 7:

It will be noted that in each case for each cycle the central portion of the wave form is substantially horizontal and the main time portion of the cycle lies in this area. Therefore, the cathode ray spot would dwell on this horizontal portion of the wave form and move over the remaining portions with much greater rapidity. Thus this portion 58 becomes the portion which can be utilized for our purpose of indicating the composite wave form. The recurrent waves are compressed as shown in Figure 7 and the portion 58 now becomes much more brilliantly illuminated inasmuch as the cathode ray spot dwells there for a considerably longer time than on any other portion of a given cycle. Therefore, these spots, or more brilliantly illuminated portions, show a continuous series across the head of the oscillograph.

Figure 8:

Figure 8 shows a much more concentrated series of such waves and their relative location indicating the wave form of the torsional vibration. The vertical location of the spots 60 depends entirely upon the position of this substantially horizontal portion 58 on the sawtooth wave from 56. If the torsional vibration of the shaft causes the horizontal portion to lag a given value, it will then be moved up on the sawtooth slope and the point 60 will be raised above a horizontal line. If, on the other hand, the wave pulse produced leads, it will be moved down the slope of the sawtooth wave and below a central horizontal line. Thus there is developed on the head of the cathode ray oscillograph, which is synchronized through its horizontal sweep circuit, a series of bright spots which vary in their vertical location and reproduce the wave form of the torsional vibration. The horizontal distance across the generated waves on the head of the cathode ray tube may of course be one or possibly two revolutions of the shaft.

However, in the system as set forth hereinbefore, while there is a visual indication of the wave form of the torsional vibration, there is not provided any means for analyzing the composite wave into the various components or frequencies into which it is composed, and I have therefore devised the system shown in Figure 9, in which case the generated and detected waves are applied both to an oscillograph or an oscilloscope and also to a wave analyzer. There is also provided a more accurate synchronizing or timing arrangement for maintaining the various portions of the system in step. In that modification there is, as before, a toothed wheel 2 with its associated series pick-up coils 12 and 14, the output of which is applied to a pulse shaper 62, the output of which is in turn applied to a mixer 64 and also to a square wave trigger circuit 66. The output of this trigger circuit is connected both to a wave analyzer, not shown, and to a smoothing circuit 68, the latter being in turn connected to a control pentode 70 which is connected back through a sawtooth oscillator 72, to the mixer 64 and also into the square wave trigger circuit 66. The output of the mixer is fed directly into the oscilloscope.

The wave impressed on the pulse shaper 62 from the pick-up coils is substantially a sine wave as shown at 74. The pulse shaper however is designed to change the form into a series of timed pulses such as shown at 76. Such a pulse shaper is formed of two sections the first being a limiter portion to block off the positive and negative peaks of the sine waves coming from the gear tooth generator. Such limiter circuits are conventional in frequency modulated broadcast receivers. The second portion or differentiator takes such flattened waves and produces sharp pulses of short duration by the use of such circuits as those shown on pages 178 and 179 of the volume on "Ultra High Frequency Technique" referred to previously. The positive pulses are erased by biased diodes. It will be evident from 74 and 76 that a short pulse is provided once per cycle when the impressed wave passes through zero. This pulse is of short duration and as mentioned above is impressed on both the mixer 64 and the square wave trigger circuit 66. Such a square wave trigger circuit is disclosed on page 174 in Figs. 4–8 of the above-identified volume on "Ultra High Frequency Techniques."

Figure 11:
Figure 10:
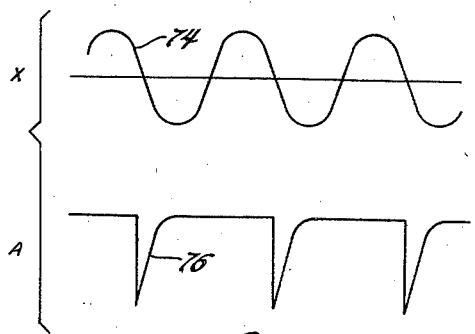
Figure 12:
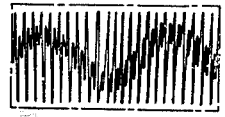

The sawtooth oscillator 72 similar to those of the first form shown also generates a sawtooth base wave that is fed into the mixer where the combined wave as shon at 78 in Fig. 11 is a product of the sawtooth base and the pulse from the pulse shaper 62. It will be evident that as in the prior case the position of the pulse 80 on the sawtooth base will vary up and down, depending upon timing or phasing, which is in turn dependent upon the torsional vibration in the rotating member. Therefore by compressing these waves together on the head of the oscilloscope, a pattern is obtained which is similar to that shown in Fig. 8 as shown in Fig. 12 where again the brighter portions will be displaced vertically and give a complex wave form depending on torsional vibration.

Figure 13:
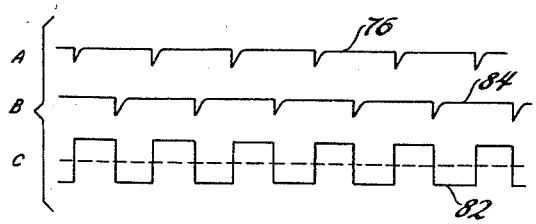
Figure 14:
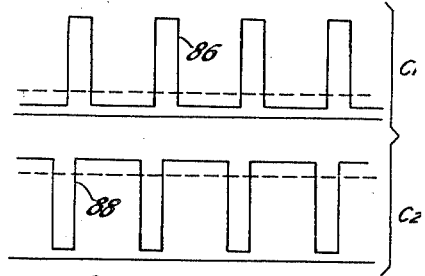

In order to maintain the sawtooth oscillator in synchronism, the feedback control circuit including the smoothing circuit 68 which is a resistance-capacity low pass filter and the control pentode 70 is provided. Such a controlled sawtooth oscillator is shown on page 186 in Figs. 4-25 of the volume on "Ultra High Frequency Techniques." The wave fed to the wave analyzer from the square wave trigger circuit 66 is shown at 82 in Fig. 13 and is controlled by the two input waves to 66, namely, the pulse 76 from the pulse shaper 62 and a pulse 84 from the sawtooth wave oscillator 72. The pulses control the current flow in the trigger circuit 66 in the nature of an alternately acting pair of electronic switches, one pulse permitting current flow through one electronic switch, and the second cutting off the first and permitting flow through the other. As can be seen in Fig. 13, this provides the square top wave 82. It will be evident that the time interval between the pulse provided by 76 and that provided by 84 will determine the length of each cycle of the square top wave 82. The smaller the phase angle between the two pulses, the narrower the waves will be, such as shown at 86 in Fig. 14, and the greater the phase angle, the wider each wave will be, such as shown at 88.

It is desirable to have the pulses of such timing as to make symmetrical square waves possible and the ideal case would be to have the pulses 76 and 84 spaced 180 electrical degrees apart at all times. Practically, however, this is not possible so a control circuit is provided to feed the square top wave output back to the oscillator to control the frequency thereof and maintain it in as nearly stepped synchronism as possible. The square top wave is fed through the smoother circuit which eliminates the wave form and provides a slowly varying D. C. potential, depending upon R. M. S. value of the wave fed in. Therefore the wider the input waves, the higher is the output potential from the smoother 68. This varying potential is then applied to the control pentode and determines the output current of this pentode. This varying current then is fed into the sawtooth oscillator and determines the frequency of oscillation thereof by varying the charging rate of the control condenser.

Therefore as the pulses tend to separate from each other, the square top wave becomes wider and the D. C. control voltage likewise increases. This causes an increase in the pentode plate current to charge the control condenser at a higher rate and increase the frequency to bring the pulses more nearly into the relation above mentioned. Of course as the two come more nearly into the relation, the control voltage decreases and exerts only a small corrective force.

The square wave in the output of the square wave trigger circuit is also applied to a wave analyzer (not shown) which determines the various frequencies present in the pulse 76. In operating this modification, the operator can usually read the complex wave form of the torsional vibration on the rotary part, as seen in the oscilloscope, and at the same time can ascertain the various frequencies present in the wave. This is an important advantage over the system of mechanically analyzing the wave form on the oscilloscope at a later time, for if any inconsistent or illogical indications are obtained, they may be immediately re-run or checked and that particular part emphasized.

I claim:

1. In means for measuring the irregularity of movement of a movable body, means having a systematic recurrence of form mounted on the movable body, stationary magnetic pick-up means in which a first wave is generated mounted in juxtaposition to the first-named means, an oscillator for generating a second wave, an oscilloscope having vertical and horizontal deflecting means and means connecting the pick-up means and the oscillator means jointly to the vertical deflecting means of the oscilloscope to obtain a visual indication of the compound wave form produced.

2. In means for measuring the irregularity of angular movement of a rotating body, toothed means mounted on said body, magnetic pick-up means stationarily mounted in juxtaposition to the toothed means in which a first wave is generated, an oscillator for generating a second wave, an oscilloscope having vertical and horizontal deflecting means and means connecting the pick-up means and the oscillator to the vertical deflecting means of the oscilloscope to obtain a visual indication of the compound wave so formed.

3. In means for measuring torsional vibration of a rotating shaft, toothed means mounted on said shaft, stationary magnetic means mounted in juxtaposition to the toothed means, pick-up coils mounted on the magnetic means, an oscillator, a mixer circuit connected to both the pick-up coils and the oscillator and an oscilloscope connected to the mixer.

4. In means for measuring torsional vibration of a rotating shaft, pick-up means mounted adjacent said shaft, pulse generating means mounted on said shaft to cooperate with the pick-up means, an oscillator for generating sawtooth waves, means for mixing the sawtooth waves from the oscillator and the pulses generated by the rotation of the shaft, an oscilloscope and means for connecting the output of the mixing means to the oscilloscope.

5. In means for measuring torsional vibration of a rotating shaft, means actuated by the shaft movement for generating pulses in timed relation to such movement, an oscillator for generating waves, means for combining the pulses and waves to form a complex wave form, and an oscilloscope having deflection electrodes connected to the output of the combining means.

6. In means for measuring torsional vibration of a rotary shaft, pulse generating means actuated by and in timed relation to shaft movement, an oscillator for generating sawtooth waves, means for combining the pulse from the pulse generating means with the sawtooth wave from the oscillator, an oscilloscope having deflecting plates and means for connecting the output of the combining means to the deflecting plates.

7. In means for measuring torsional vibration of a rotary shaft, pulse generating means actuated by and in timed relation to shaft movement, an oscillator for generating sawtooth waves, means for synchronizing the frequency of the oscillator with the pulse frequency, mixing means for combining the sawtooth wave and the pulse to form a complex wave, an oscilloscope having deflecting plates and means connecting the mixing means to the deflecting plates.

8. In means for measuring torsional vibration of a rotary shaft, pulse generating means actuated by and in timed relation to shaft movement, an oscillator for generating sawtooth waves, means for synchronizing the frequency of the oscillator with the pulse frequency, mixing means for combining the sawtooth wave and the pulse to form a complex wave, an oscilloscope having deflecting plates, means connecting the mixing means to the deflecting plates, and a time sweep oscillator connected to additional plates and synchronized with the generated pulse.

9. In means for measuring torsional vibration of a rotary shaft, pulse generating means actuated by and in timed relation to the shaft movement, an oscillator for generating waves, a square wave generator connected to both the pulse generator and the oscillator whose output is adapted to be connected to a wave analyzer.

10. In means for measuring torsional vibration of a rotary shaft, pulse generating means actuated by and in timed relation to the shaft movement, an oscillator for generating waves, a square wave generator connected to both the pulse generator and the oscillator whose output is adapted to be connected to a wave analyzer, and feedback means between the output of the square wave generator and the oscillator to control the frequency thereof.

11. In means for measuring torsional vibration of a rotary shaft, pulse generating means actuated by and in timed relation to the shaft movement, an oscillator for generating waves, a square wave generator connected to both the pulse generator and the oscillator whose output is adapted to be connected to a wave analyzer, feedback means between the output of the square wave generator and the oscillator to control the frequency thereof, said feedback means including means for converting the square wave output into fluctuating direct current and means applying said current to control the frequency of the oscillator.

12. In means for measuring torsional vibration of a rotary shaft, pulse generating means actuated by and in timed relation to the shaft movement, an oscillator for generating waves, a square wave generator connected to both the pulse generator and the oscillator whose output is adapted to be connected to a wave analyzer, feed back control means between the square wave generator and the oscillator and mixing means also connected to both the pulse generator and the oscillator to provide a complex wave for an oscilloscope.

13. In means for measuring torsional vibration of a rotating shaft, pulse generating means actuated by rotation of the shaft, a sawtooth oscillator, means for mixing the pulse and sawtooth wave together in synchronism so that the pulse will form an irregular section on the sawtooth base and its location therealong will be dependent on the phase, and means for viewing a recurrent series of these composite waves, the series forming a wave form of vibration.

LAWRENCE F. HOPE.